United States Patent
Le et al.

(10) Patent No.: US 12,192,918 B2
(45) Date of Patent: Jan. 7, 2025

(54) TECHNIQUES FOR BANDWIDTH PART SWITCHING ADAPTIVE VOLTAGE AND CLOCK CONFIGURATION

(71) Applicant: Apple Inc., Cupertino, CA (US)

(72) Inventors: Thuyen Le, Taufkirchen (DE); Zhibin Yu, Unterhaching (DE)

(73) Assignee: Apple Inc., Cupertino, CA (US)

( * ) Notice: Subject to any disclaimer, the term of this patent is extended or adjusted under 35 U.S.C. 154(b) by 893 days.

(21) Appl. No.: 17/276,382

(22) PCT Filed: Aug. 13, 2019

(86) PCT No.: PCT/EP2019/071666
§ 371 (c)(1),
(2) Date: Jan. 3, 2022

(87) PCT Pub. No.: WO2020/064206
PCT Pub. Date: Apr. 2, 2020

(65) Prior Publication Data
US 2022/0240199 A1    Jul. 28, 2022

(30) Foreign Application Priority Data

Sep. 26, 2018 (EP) .................................... 18196985

(51) Int. Cl.
*H04W 52/36* (2009.01)
*H04L 1/00* (2006.01)
(Continued)

(52) U.S. Cl.
CPC ......... *H04W 52/367* (2013.01); *H04L 1/0025* (2013.01); *H04L 27/26025* (2021.01);
(Continued)

(58) Field of Classification Search
CPC .............. H04W 52/367; H04W 52/28; H04W 72/044; H04W 72/23; H04W 88/06;
(Continued)

(56) References Cited

U.S. PATENT DOCUMENTS

2014/0301262 A1   10/2014   Homchaudhuri et al.
2018/0007631 A1    1/2018   Yu et al.
(Continued)

FOREIGN PATENT DOCUMENTS

WO     2018125686 A2    7/2018

OTHER PUBLICATIONS

International Search Report and Written Opinion for International Application No. PCT/EP2019/071666, date mailed Sep. 20, 2019, 12 pgs.
(Continued)

*Primary Examiner* — Dinh Nguyen
(74) *Attorney, Agent, or Firm* — Kowert, Hood, Munyon, Rankin & Goetzel, P.C.

(57) ABSTRACT

This disclosure relates to a baseband processor for processing down-converted and quantized radio frequency, RF, signals of an RF transceiver in baseband, wherein the baseband processor is configured to: detect an RF operation mode switching of the RF transceiver, and initiate a change of a voltage setting and an associated system clock rate of the baseband processor based on detecting the operation mode switching of the RF transceiver.

20 Claims, 7 Drawing Sheets

(51) Int. Cl.
  *H04L 27/26*    (2006.01)
  *H04W 52/28*    (2009.01)
  *H04W 72/044*   (2023.01)
  *H04W 72/23*    (2023.01)
(52) U.S. Cl.
  CPC ......... *H04W 52/28* (2013.01); *H04W 72/044* (2013.01); *H04W 72/23* (2023.01)
(58) Field of Classification Search
  CPC ..... H04W 52/44; H04W 52/04; H04W 52/00; H04L 1/0025; H04L 27/26025
  See application file for complete search history.

(56) References Cited

U.S. PATENT DOCUMENTS

2019/0044811 A1* 2/2019 Miao ................... H04L 5/001
2020/0067676 A1* 2/2020 Yi ..................... H04W 72/0446

OTHER PUBLICATIONS

International Preliminary Report on Patentability for International Application No. PCT/EP2019/071666, date mailed Sep. 18, 2020, 8 pgs.

* cited by examiner

TECHNIQUES FOR BANDWIDTH PART SWITCHING ADAPTIVE VOLTAGE AND CLOCK CONFIGURATION

This application is a U.S. National Stage filing of International Application No. PCT/EP2019/071666, filed Aug. 13, 2019, titled "TECHNIQUES FOR BANDWIDTH PART SWITCHING ADAPTIVE VOLTAGE AND CLOCK CONFIGURATION", which claims the benefit of priority to the European Application No. 18196985.8, filed Sep. 26, 2018. All of the aforementioned applications are incorporated herein by reference in their entireties.

FIELD

The disclosure relates to techniques for bandwidth part switching adaptive voltage and clock configuration, in particular of a baseband processor or a User Equipment (UE) circuitry including baseband processor and RF transceiver, and a corresponding method. The disclosure particularly relates to methods of reducing UE baseband processor power consumption by applying dynamic voltage and frequency scaling (DVFS) during Band-Width Part (BWP) switching period for 5G NR (New Radio) UE implementation.

BACKGROUND

5G NR technology has been released since 3GPP release 15 in 2017. Comparing with 4G LTE, 5G NR has much better spectrum efficiency by adapting flexible radio technologies: for example, adaptive configuration of numerology (flexible sampling rage and flexible sub-carrier spacing) as well as RF bandwidth and central carrier frequency of physical layer wireless signals through bandwidth part (BWP) switching. 5G NR brings in challenges for UE modem implantation because UE modem needs to provide the real-time signal processing capability to handle the worst case timing situations in the worst case numerology, while still need to keep the overall power consumption as low as possible (lower power consumption results in longer battery life and therefore better user experiences in a user equipment). The disclosure deals with the question how to reduce the UE power consumption for 5G NR, while still keeping the wireless link robustness.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
5G NR: 3GPP fifth generation new radio specifications
UE: User Equipment
LTE: Long Term Evolution
BWP: bandwidth part
DVFS: dynamic voltage and frequency scaling
SCS: subcarrier spacing
RB: resource block
PMIC: power management integrated circuit
DSP: Digital Signal Processor
IC: Integrated Circuit
RF: Radio Frequency
V: voltage
F: frequency or clock rate
DCI: downlink control indication
IQ: in-phase/quadrature
UL: uplink
DL: downlink
PDCCH: physical downlink control channel
PDSCH: physical downlink shared channel
PUCCH: physical uplink control channel
PUSCH: physical uplink shared channel
PLL: phase locked loop
FFT: Fast Fourier transform
FIR: Finite Impulse Response
CC: Component Carrier It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The techniques described herein may be implemented in wireless communication networks, in particular communication networks based on mobile communication standards such as 5G new radio (NR), in particular for millimeter-wave data rate. The techniques may also be applied in LTE networks, in particular LTE-A and/or OFDM and successor standards. The methods are also applicable for high speed communication standards from the 802.11 family according to the WiFi alliance, e.g. 802.11ad and successor standards. The methods and devices described below may be implemented in electronic devices such as cellular handsets and mobile or wireless devices or User Equipment communicating with access points and/or base stations. The described devices may include integrated circuits and/or passives and may be manufactured according to various technologies. For example, the circuits may be designed as logic integrated circuits, ASICs, analog integrated circuits, mixed signal integrated circuits, optical circuits, memory circuits and/or integrated passives.

Figure 1:
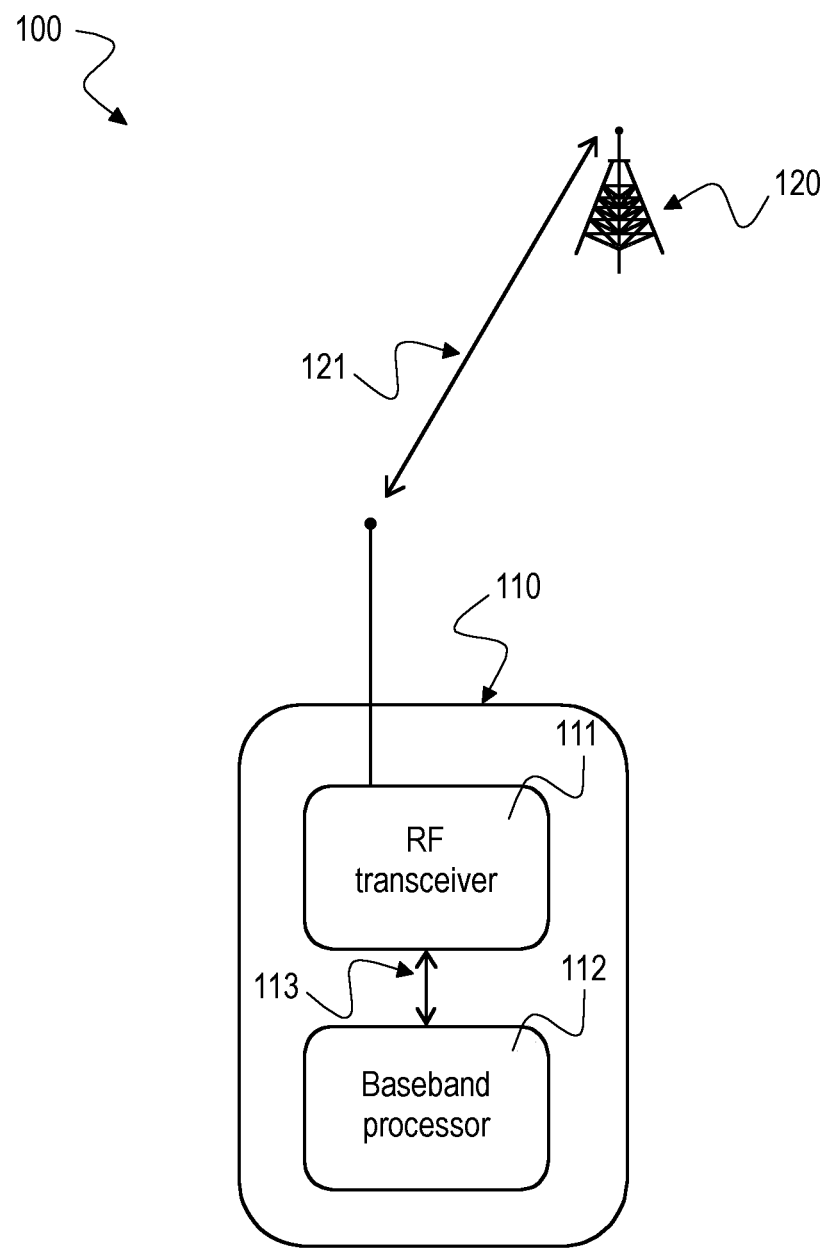
FIG. 1 is a schematic diagram illustrating a communication system 100 with a base station 120 and a user equipment (UE) 110 including an RF (Radio Frequency) transceiver 111 and a baseband processor 112.

FIG. 1 is a schematic diagram illustrating a communication system 100 with a base station 120 and a user equipment (UE) 110 including an RF (Radio Frequency) transceiver 111 and a baseband processor 112 which are connected via an interface 113, in particular a digital interface. The UE 110 is connected to the base station 120, in particular a gNodeB according to 5G terminology, for receiving downlink wireless signals 121 from the base station and transmitting uplink wireless signals 121 to the base station.

The user equipment 110 is configured for 5G NR communication. Compared with 4G LTE, 5G NR has much better spectrum efficiency by adapting flexible radio technologies. Thus, the UE 110 can perform adaptive configuration of numerology (flexible sampling range and flexible sub-carrier spacing) as well as RFbandwidth and central carrier frequency of physical layer wireless signals through bandwidth part (BWP) switching. A UE (or UE circuitry or UE modem) according to the disclosure as described hereinafter is able to provide real-time signal processing capability to handle the worst case timing situations in the worst case numerology, while still keeping the overall power consumption as low as possible. The lower power consumption results in longer battery life and therefore better user experiences. The UE 110 is able to reduce the UE power consumption for 5G NR, while still keeping the wireless link robustness by applying concepts/techniques as described in the following.

Different NR bandwidth parts (BWPs) can be associated with different numerologies and different effective bandwidths. Thus different BWPs require different real-time processing capability for UE baseband processor 112 so as to handle wireless signals 121 within a BWP (E.g. When BWPs contain the same number of resource blocks, the one associated with lower SCS (sub-carrier spacing) results in longer time duration of a NR downlink slot which linearly relaxes the system clock rate for real-time processing the IQ samples within the BWP; E.g. when BWPs are associated with the same SCS, the one with more number of resource blocks requires higher system clock rate to real-time process the IQ samples within the BWP).

According to 3GPP NR specification, BWP switching is applied in RRC_CONNECTED mode. RAN4 standardization has reserved a RF interruption time to allow UE 110 to temporarily stop the communication with the base station 120 and to reconfigure the RF operation mode based on the new BWP: e.g. switching the filter bandwidth, switching the sampling rate or switching the central carrier frequency. The maximal allowed interruption time duration is 350 us. The key idea is that, during the RF interruption time which is originally reserved by RAN4 standardization for RF switching for the new BWP, the UE baseband processor 112 can also benefit from this time-gap to be able to apply Dynamical Voltage and Frequency Scaling (DVFS) adapted so as to minimize the clock and voltage setting adapted to the new parameters (e.g. SCS, RB numbers) associated to the new BWP. This optimizes the dynamical power consumption within the UE baseband processor 112.

A main concept of this disclosure is based on utilizing dynamical BWP switching in RRC_CONNECTED mode as a new scenario in 5G NR, so as to opportunistically apply DVFS to achieve aggressive UE dynamical power reduction.

Figure 2:
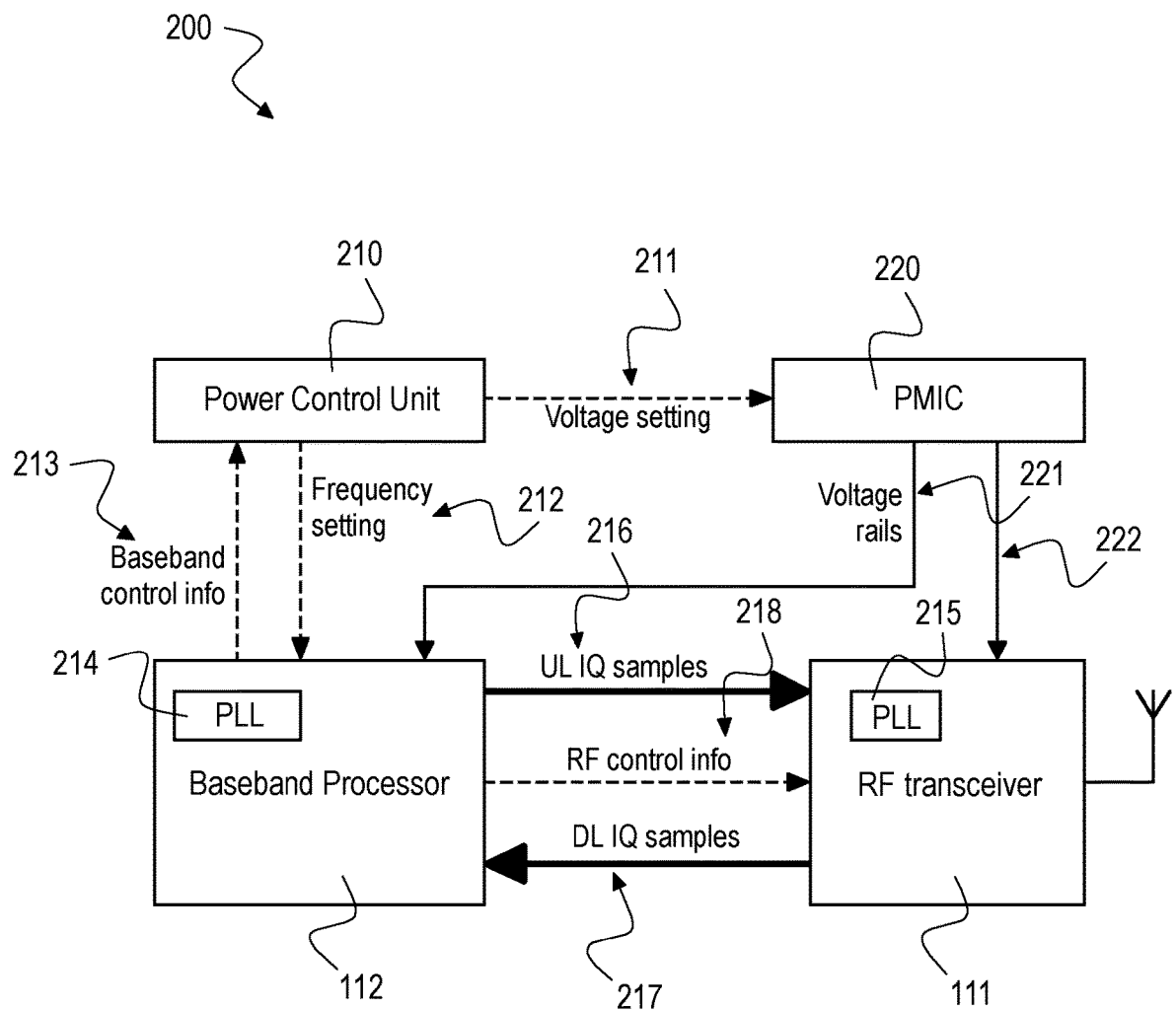
FIG. 2 is a block diagram illustrating an exemplary UE modem 200 according to the disclosure.

FIG. 2 is a block diagram illustrating an exemplary UE modem 200 according to the disclosure. The UE modem 200 consists of a UE baseband processor 112 (e.g. as already illustrated in FIG. 1), a power control unit 210 and a RF transceiver 111 (e.g. as already illustrated in FIG. 1).

The baseband processor 112 and the RF transceiver 111 are usually operating in different power and clock domains and they are bridged through a digRF interface 216, 217, 218 (e.g. corresponding the interface 113 illustrated in FIG. 1). However, in some implementations baseband processor 112 and the RF transceiver 111 may operate in the same power and clock domain. DigRF interface may include RF control information 218 and Uplink IQ samples 216 from baseband processor to RF transceiver as well as Downlink IQ samples 217 in reverse direction. The RF transceiver 111 is operating in a slave mode controlled by the baseband processor 112. The Power Control Unit 210 can receive decoded control information 213 from the physical layer (from baseband processor 112) and can dynamically request the new voltage setting 211, as well as change the system clock rate, i.e. the frequency setting 212 (e.g. via PLL 214 re-configuration) for the baseband processor 112. Adjustment of voltage is performed by an external PMIC (Power Management Integrated Circuit) 220. Voltage rails 221, 222 are used to adjust the voltage settings of baseband processor 112 and RF transceiver 111. The RF transceiver 111 may include a PLL 215 as well to apply reconfiguration of system clock and frequency settings specific for the RF transceiver 111.

Note that FIG. 2 is an abstracted block diagram but not necessarily reflecting the true hardware partitioning of a modem hardware. For example, in a real implementation, the baseband processor 112 and the power control unit 210 may be allocated within a same modem IC but in different power/clock domains. In that case, the baseband processor 112 can be a DSP cluster which applies NR physical layer digital signal processing whose processing load is scaled with different BWP configurations; while the power control unit 210 can be a software module within the L1 controller (of baseband processor 112) which is in a different power/clock domain. PMIC 220 is usually a stand-alone external component to baseband 112 and RF chip 111, but such restriction is not necessary for performing the concepts described in this disclosure. Hence, in an exemplary implementation the PMIC 220 may be implemented on a common circuitry with the baseband processor and/or the RF transceiver 111.

In 5G NR, Bandwidth Part (BWP) is defined as contiguous set of physical resource blocks (RBs), selected from a contiguous subset of the common resource blocks for a given numerology on a given carrier. In RRC_CONNECTED mode, BWP switching is allowed by reserving certain interruption time (minimal 250 us based on latest 3GPP RAN4 discussions) on UE side, so that UE is able to change the RF operation mode for the new bandwidth or the new numerology associated to the new BWP (e.g. by switching to a different RF bandwidth; switching to a different sampling rate; switching to a different central frequency).

A main idea of this disclosure is that, in parallel with the operation mode switching on RF transceiver 111 side, e.g. BWP switching, UE baseband processor 112 can dynamically change its voltage setting 221 as well as the associated system clock rate (i.e. frequency setting 212) based on the new BWP, so that the dynamical power consumption of the baseband processor 112 is minimized.

While operation mode switching is referred in the main context of this disclosure to Bandwidth Part switching, this does not restrict the meaning of operation mode switching. For example in other contexts, operation mode switching may refer to power mode switching or frequency switching or clock switching in general without the restriction to bandwidth part. Thus, operation mode switching in its general meaning is not exclusively related to 5G communication systems, i.e. the concepts according to this disclosure may also be applied in other communication standards, e.g. WiFi, LTE, etc.

Figure 3:
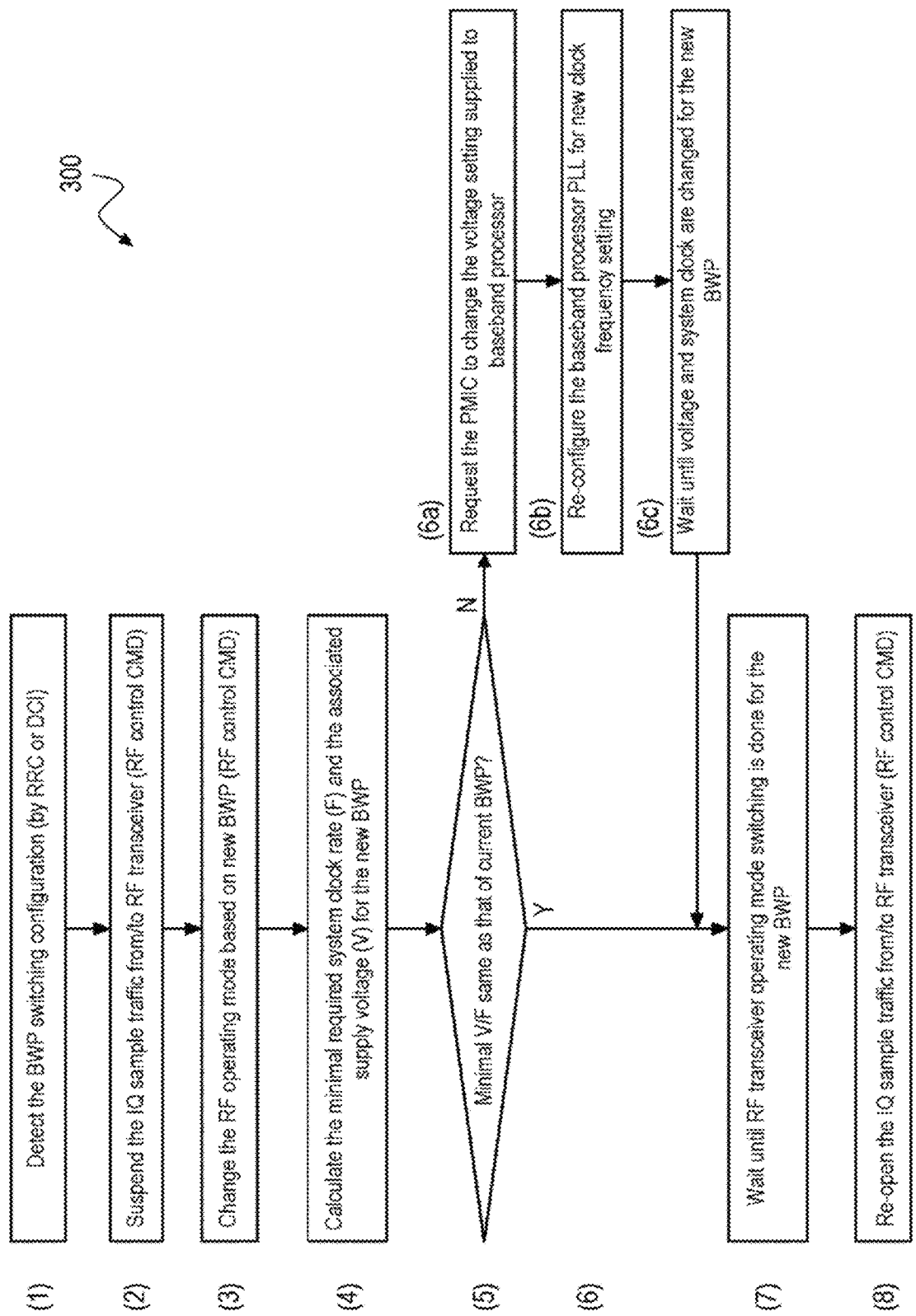
FIG. 3 is a schematic diagram of an exemplary procedure 300 within a baseband processor for implementing a method for configuring voltage and clock settings of the BB processor according to the disclosure.

FIG. 3 is a schematic diagram of an exemplary procedure 300 within a baseband processor for implementing a method for configuring voltage and clock settings of the BB processor according to the disclosure.

To implement the disclosed method, FIG. 3 shows one example control flow within the baseband processor, e.g. a baseband processor 112 as described above with respect to FIGS. 2 and 1. The control flow includes a plurality of blocks, i.e. blocks (1) to (8) and (6a), (6b), (6c) that may be implemented in hardware or in software or in combination.

In block (1), UE baseband processor 112 monitors the decoded control information from the base station 120 and activates the following procedures until a BWP switching request from the base station 120 is detected. Such request may be triggered by Radio Resource Control (RRC) information or Downlink Control Indication (DCI) from PDCCH. In block (2), when a BWP switching request is detected, baseband processor 112 sends RF control commands (e.g. by RF control info 218 shown in FIG. 2) to the RF transceiver 111 to suspend/stop the IQ sample traffic in both uplink (UL) 216 and downlink (DL) 217, e.g. as illustrated in FIG. 2. In block (3), based on the new BWP configuration (possibly associated to a new numerology or a new bandwidth or a new central frequency or a combination of all), baseband processor 112 sends RF control commands 218 to RF transceiver 111 to change its operation mode accordingly (e.g. sampling rate switching, RF bandwidth switching or central frequency switching, or a combination of all).

In block (4), the baseband processor 112 calculates or determines the minimal required system clock rate as well as the associated minimal supply voltage based on the parameters of the new BWP; the parameters which affect the setting are: sub-carrier spacing (SCS) and/or number of resource blocks (RB) within the new BWP.

The minimal system clock rate can be obtained through a look-up table operation where the table contains the pre-estimated minimal system clock rates mapped to all possible BWP parameters. The minimal system clock rate can also be obtained through a linear scaling from a pre-estimated minimal system clock rate which is mapped to the minimal BWP parameters, that is, to assume the number of baseband signal processing operations is linearly increased with respect to the BWP parameters. It is a reasonable approximation when ignoring the processing overhead.

As a further extension, the minimal clock rate can also be determined by number of activated RX antenna ports, with which the number of baseband processing operations scale up. The minimal clock rate can also be determined by channel conditions. That is, because for low-quality channels, complex signal processing algorithm (e.g. Channel Estimation) needs to be selected which needs more operations and therefore higher clock rate.

In one example, the minimal clock rate for a BWP can be computed in the following form:

$$f_{clk,min} = \frac{N_{rb} \cdot N_a}{T_{slot}} \quad (1)$$

where $T_{slot}$ is the time duration of a NR slot, which is inversely linearly scaled with sub-carrier-spacing associated to a BWP configuration: for 15 kHz SCS it is 1 ms, for 30 kHz SCS it is 0.5 ms, etc. $N_{rb}$ is the number of resource blocks per slot associated to a BWP configuration, which can be processed by the baseband processor. $N_a$ is the normalized processing load within a NR slot for a BWP configuration. $N_a$ can be defined to be the number of signal processing operations, which is normalized by the number of resource blocks, that need to be executed within a NR slot duration. $N_a$ is determined by the baseband signal processing algorithms (e.g. FFT, channel estimation, MIMO detection, channel decoding, etc.). $N_a$ can be adapted to different BWP configurations so that base band algorithm can be optimized for different BWP configurations.

For example, when the BWP is switched to have higher SCS, the correlation between frequency domain adjacent reference sub-carriers is reduced, and therefore the number of frequency domain FIR (Wiener filter) taps for channel estimation can be reduced, or a total different filtering algorithm (e.g. linear interpolation) can be selected, so that $N_a$ can be reduced.

In another example, the BWP can be switched to have a different central carrier frequency so that the new BWP suffers less interference from adjacent bands, the corresponding interference mitigation algorithms can then be disabled, which also makes $N_a$ to be reduced.

In another example clock/voltage can be adapted to the central carrier frequency change associated to the BWP switching. In yet another example, the adjacent band interference measurement around the central carrier frequency of a BWP can be adapted.

After the minimal system clock rate is obtained, the associated minimal supply voltage can be obtained through another look-up table operation, where the table may be offline derived, e.g. based on the manufacturing technology of the modem chip.

In block (5) the obtained minimal required system clock rate as well as the associated minimal supply voltage is compared with that of the current BWP: when they are different, the baseband processor may request the PMIC in block (6a) to change the voltage setting supplied to baseband processor 112, request the power control unit in block (6b) to update its clock rate (e.g. via PLL re-configuration) and wait in block (6c) until the updating is finished and voltage and system clock are changed for the new BWP.

In block (7) the baseband processor 112 also waits until the operation mode switching in RF transceiver 111 is completed. In block (8) the baseband processor 112 re-opens the IQ sample traffic 216, 217 between baseband processor 112 and the RF transceiver 111, so as to resume the wireless communications between UE modem 200 and the base station 120.

Figure 4:
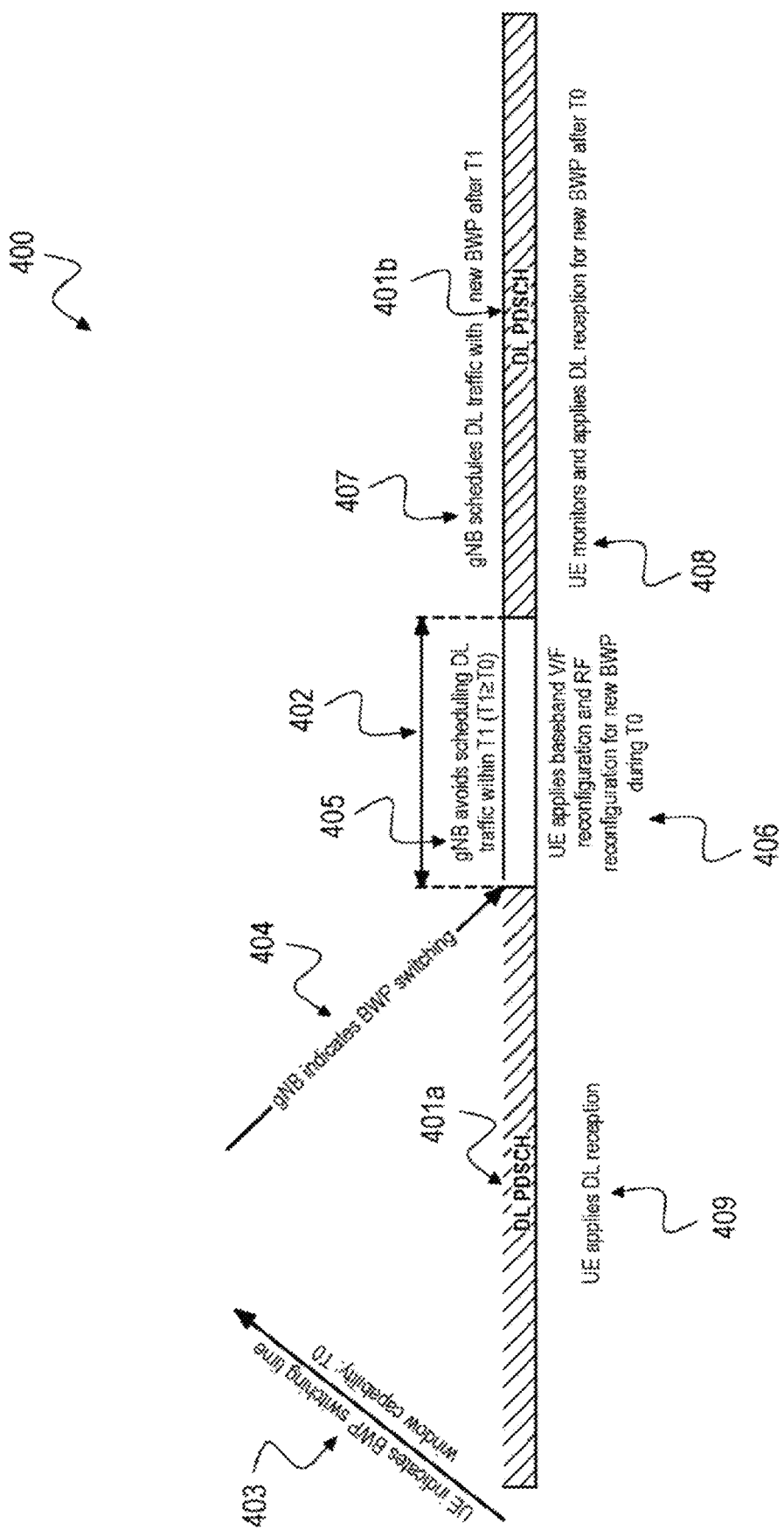
FIG. 4 is a schematic diagram illustrating an exemplary procedure 400 for robust BWP switching with signaling enhancement according to the disclosure.

FIG. 4 is a schematic diagram illustrating an exemplary procedure 400 for robust BWP switching with signaling enhancement according to the disclosure.

FIG. 4 illustrates signaling enhancements as a further extension to reduce the negative impact of link robustness due to BWP switching. In one example, UE 110 applies DL reception 409 on DL PDSCH 401a and can indicate 403 its switching window capability (T0) to the gNB 120. The UE switching window capability may be defined as the maximal time duration from the time duration required by RFIC 111 related re-configuration for the new BWP and the time duration required by baseband processor 112 V/F related re-configuration for the new BWP. The UE switching window capability can be different per RF band or per component carrier (CC) numbers.

Subsequently, when gNB 120 indicates 404 to apply BWP switching, the gNB 120 can allow an interruption time window T1, 402 which is larger or equal than UE indicated switching window capability T0, by avoiding 405 scheduling DL traffic (PDCCH and PDSCH) or UL traffic (PUCCH and PUSCH) during the interruption time window T1, 402. The UE 110 hence applies 406 baseband V/F re-configuration and RF re-configuration for new BWP during T0; gNB schedules 407 DL traffic with new BWP after T1, 402; and UE monitors 408 and applies DL reception for new BWP after T0.

Furthermore, gNB 120 can also schedule low-priority traffics (with lower QoS requirements) into PDSCH 401a, 401b within the interruption time window T1, 402, so that when UE 110 can opportunistically finish the switching before the interruption time window T1, 402, it can still decode the scheduled traffic from PDSCH immediately.

Figure 5:
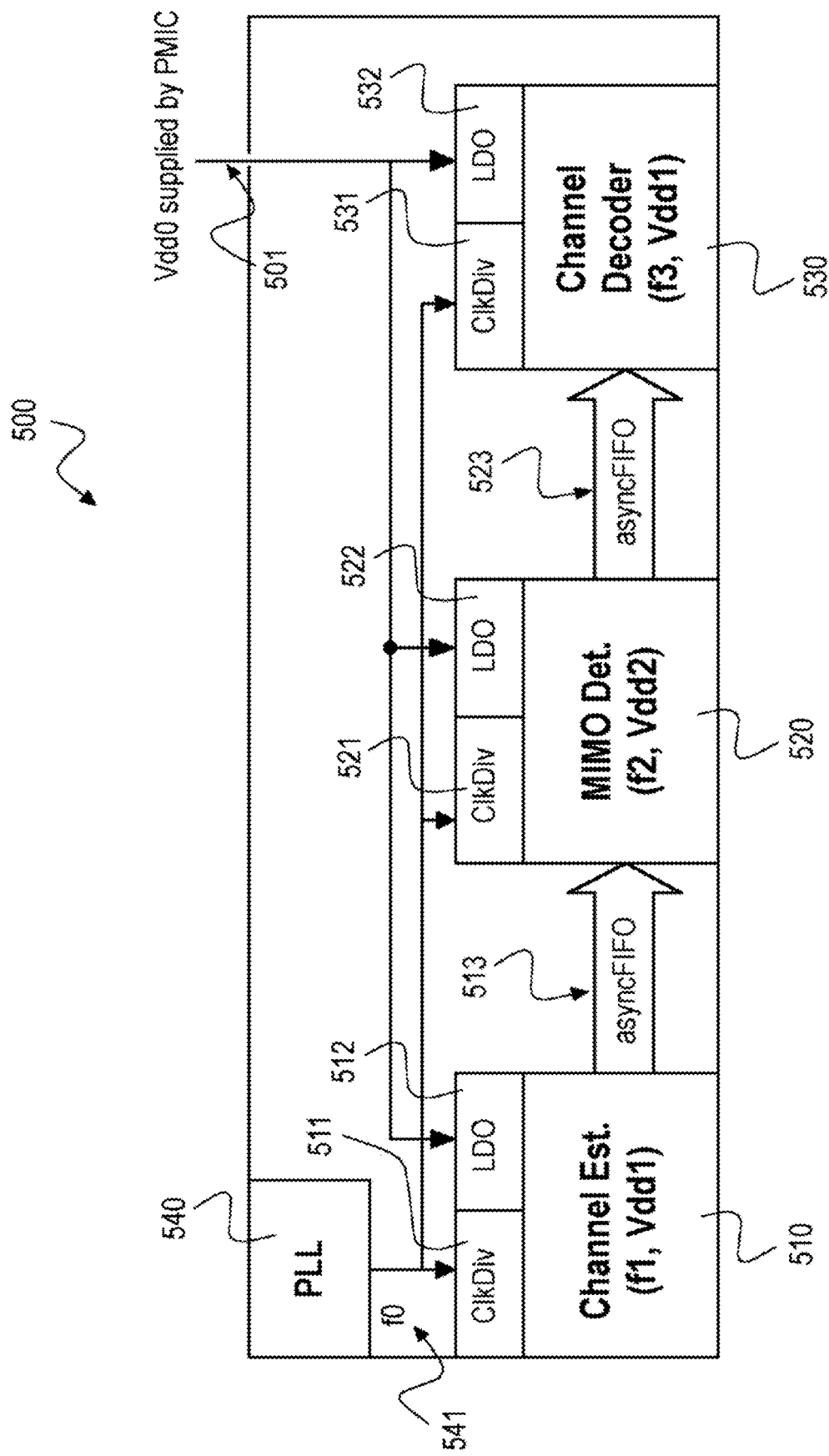
FIG. 5 is a block diagram illustrating an exemplary baseband processor 500 with BWP adapted clock and voltage reconfiguration per voltage-clock domain according to the disclosure.

FIG. 5 is a block diagram illustrating an exemplary baseband processor 500 with BWP adapted clock and voltage reconfiguration per voltage-clock domain according to the disclosure.

As another further extension, the disclosed BWP adapted voltage and clock reconfiguration can be applied per clock-voltage domain separately within the baseband processor 112, 500, while each clock-voltage domain 510, 520, 530 can contain the circuitry which has a modularized functionality (e.g. a channel estimator in 510 or a MIMO detector in 520 or a channel decoder in 530, etc.). This avoids the inter-chip communications between baseband processor IC 112 and the PMIC 220 as shown in FIG. 2. This can also further optimize the power consumption because different baseband functionalities within a baseband processor 500, 112 can have different clock requirements due to a BWP change.

One example is illustrated in FIG. 5 which shows three (or more) clock-voltage domains 510, 520, 530 within a baseband processor 500: a channel estimator (in 510), a MIMO detector (in 520), and a channel decoder (in 530). They can communicate with each other via asynchronous FIFOs 513, 523. Each domain 510, 520, 530 can have a different clock setting by applying different clock division ratios on the modem system clock (f0) 541 through a (respective) clock divider 511, 521, 531. Each domain 510, 520, 530 can also have a different DC power supply by applying different power regulation factors on the modem power supply (Vdd0) 501 by (respective) low-dropouts (LDOs) 512, 522, 532. When the updated BWP contains a double number of resource blocks (e.g. from 50 to 100), but half the subcarrier spacing, SCS (e.g. from 30 kHz down to 15 kHz), by referring to formula (1) described above with respect to FIG. 3, $f_{clk,min}$ can stay the same if $N_a$ is not changed. For example, $N_a$ can be unchanged for MIMO detector 520 and channel decoder 530, but can be adapted for the channel estimator 510 because the new property of SCS can have different impacts on the frequency domain filtering algorithm. As a result, in this case, it can result in an updated clock setting and voltage setting for channel estimator domain 510 (f1, Vdd1), while the clock and voltage settings for the other domains 520, 530 can still be unchanged.

Figure 6:
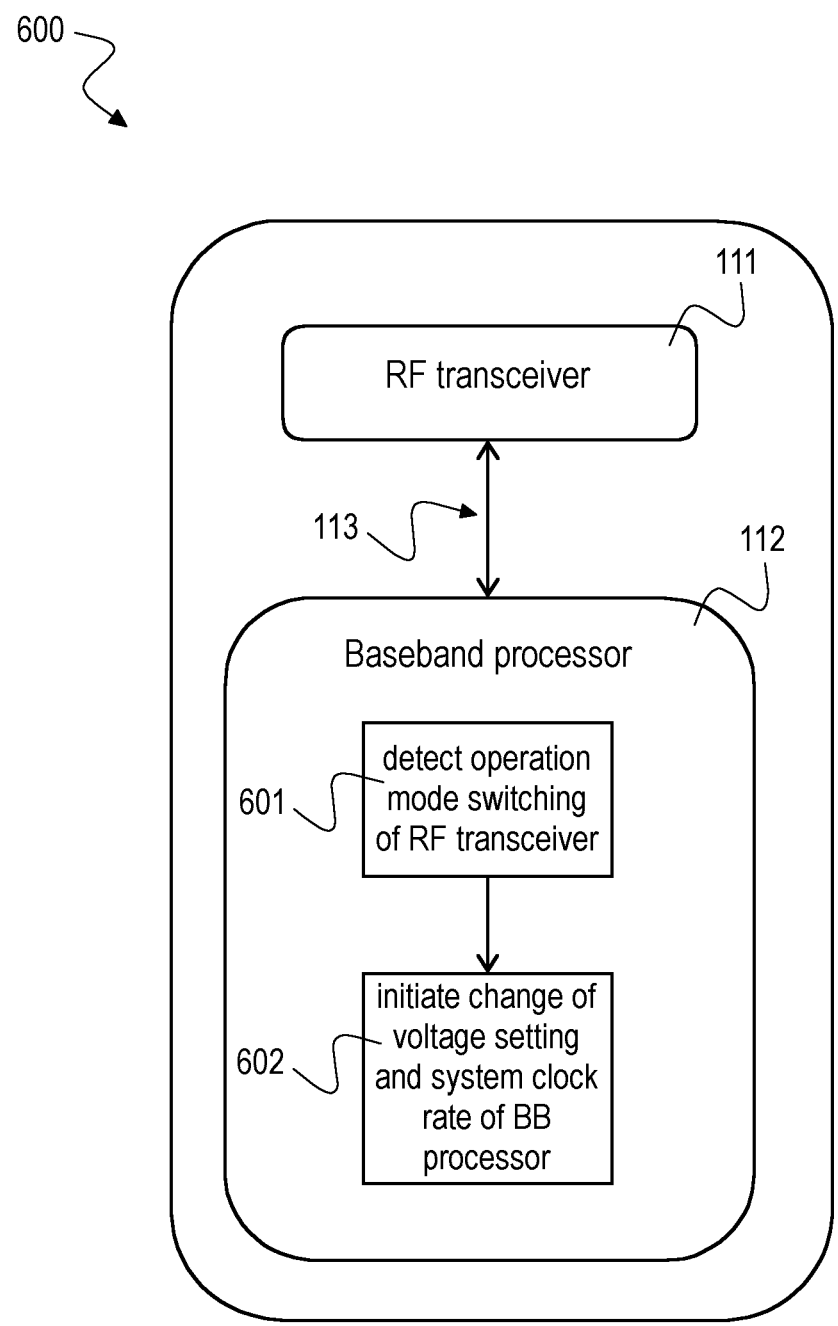
FIG. 6 is a block diagram illustrating an exemplary UE circuitry 600 with RF transceiver 111 and baseband processor 112 according to the disclosure.

FIG. 6 is a block diagram illustrating an exemplary UE circuitry 600 with RF transceiver 111 and baseband processor 112 according to the disclosure.

The baseband processor 121 processes down-converted and quantized radio frequency, RF, signals 121 of the RF transceiver 111 in baseband, e.g. as described above with respect to FIG. 1. The baseband processor 112 is configured to detect an RF operation mode switching 601 of the RF transceiver 111 and to initiate a change 602 of a voltage setting, e.g. a voltage setting, and an associated system clock rate of the baseband processor 112 based on detecting the operation mode switching 601 of the RF transceiver 111.

For example, detecting the RF operation mode switching 601 may comprises detecting a Downlink Control Information (DCI) from a Physical Downlink Control Channel, PDCCH from the base station 120.

The RF operation mode switching may comprise switching a bandwidth part, BWP, configuration of the RF transceiver, e.g. as described above with respect to FIGS. 2 to 5. Switching the BWP configuration may comprise switching at least one of a numerology, a number of contiguous resource blocks, RBs, and frequency domain location information of the contiguous RBs.

The baseband processor 112 may be configured to monitor decoded control information from a base station 120 and detect a bandwidth part (BWP) switching request from the base station 120. The BWP switching request may comprise a new BWP configuration for the RF transceiver 111.

The baseband processor 112 may be configured to control the RF transceiver 111 to stop IQ sample traffic 216, 217 with the baseband processor 112 in at least one of Uplink and Downlink upon detection of the BWP switching request, e.g. as described above with respect to FIG. 2. The baseband processor 112 may be configured to control the RF transceiver 111 to change its BWP configuration to the new BWP configuration.

The baseband processor 112 may be configured to determine a new minimum required system clock rate 212, 541 and an associated minimum required voltage setting value 221, 501 of the baseband processor 112 based on the new BWP configuration for the RF transceiver 111, e.g. as described above with respect to FIGS. 2 and 5. The baseband processor 112 may be configured to determine the minimum required system clock rate 212, 541 and an associated minimum required voltage setting value 221, 501 of the baseband processor 112 based on a sub-carrier spacing, SCS, and a number of resource blocks, RBs, within the new BWP configuration.

The baseband processor 112 may be configured to request a power management circuitry 220 to update its voltage setting 221 for the baseband processor according to the newly determined voltage setting value 221, 501; and to request a clock control circuitry 210 to update a clock rate 212 of the baseband processor 112 according to the newly determined minimum required system clock rate, e.g. as described above with respect to FIG. 2.

The baseband processor 112 may be configured to control the RF transceiver 111 to reopen the IQ sample traffic 216, 217 with the baseband processor 112 after completion of the RF operation mode switching of the RF transceiver 111, e.g. as described above with respect to FIG. 2.

The baseband processor 112 may be configured to control the RF transceiver 111 to reopen IQ sample traffic 216, 217 with the baseband processor 112 when the RF transceiver 111 has changed its RF operation mode for the new BWP configuration and no earlier than a time at which the clock rate and the voltage setting value for the baseband processor 112 has been changed.

The baseband processor 112 may be configured to determine the new system clock rate based on a number of resource blocks associated to the new BWP configuration, a processing load within a time slot for the new BWP configuration and a time duration of the time slot, e.g. as described above with respect to FIGS. 2 to 5.

The baseband processor 112 may be configured to determine the new system clock rate as a minimum required system clock rate $f_{clk,min}$ according to the relation $f_{clk,min} = N_{rb} N_a / T_{slot}$, where $N_{rb}$ is a total number of resource blocks, RBs, within a new radio, NR, slot indicated by the new BWP configuration, $N_a$ is the number of processing operations normalized by the total number of RBs within a NR slot and $T_{slot}$ is the time duration of the NR slot, e.g. according to formula (1) as described above with respect to FIG. 3.

The baseband processor 112 may be configured to determine the time duration of the NR slot based on a sub-carrier-spacing, SCS, indicated by the new BWP configuration. The baseband processor may be configured to adapt a frequency domain filtering algorithm based on the SCS indicated by the new BWP, and adapt $N_a$ in the relation $f_{clk,min} = N_{rb} N_a / T_{slot}$ based on the adapted frequency domain filtering algorithm. This may also impact the final minimal clock setting and the associated minimal voltage setting for the new BWP.

The baseband processor 112 may be configured to adapt interference mitigation algorithms processed by the baseband processor based on a switching of the BWP configuration.

The baseband processor 112 may be configured to disable the interference mitigation algorithms when the BWP is switched to have a different central carrier frequency so that the new BWP suffers less interference from adjacent bands. The baseband processor 112 may be configured to determine a new minimum required system clock rate and an associated minimum required voltage setting value of the baseband processor based on the adapted or disabled interference mitigation algorithms. This is because $N_a$ in the above formula is changed after the algorithm adaption based on the central carrier frequency of the new BWP.

The baseband processor 112 may be configured to signal a BWP switching window capability T0, 403 to the base station 120, e.g. as described above with respect to FIG. 4. The switching window capability T0, 403 indicates a total time required for the RF transceiver 111 to change its BWP configuration and for the baseband processor 112 to change its voltage setting 221 and associated system clock rate 212, e.g. as described above with respect to FIG. 2.

The baseband processor 112 may be configured to change a voltage setting 501 and an associated system clock rate 541 independently per clock-voltage domain 510, 520, 530 within the baseband processor 112, 500, e.g. as described above with respect to FIG. 5.

The UE circuitry 600 with RF transceiver 111 and baseband processor 112 may be arranged in a UE 110 as illustrated in FIG. 1 that connects to a base station 120.

Such a base station 120 may be configured to transmit control information 121 to the UE 110. The control information 121 indicates an RF operation mode switching of the RF transceiver 111 of the UE 110 and a corresponding change of a voltage setting and an associated system clock rate of the baseband processor 112 of the UE 110.

The base station 120 may be configured to receive a Bandwidth Part, BWP, switching time window capability from the UE. The BWP switching time window capability indicates a time window for the RF transceiver 111 to change its Bandwidth Part, BWP, configuration and a time window for the baseband processor 112 to change its voltage setting and associated system clock rate, e.g. as described above with respect to FIG. 4.

The base station 120 may be configured to suspend scheduling of Physical Downlink Control Channel, PDCCH, and Physical Downlink Shared Channel, PDSCH, to the UE based on the switching window capability within the time window for the RF transceiver to change its BWP configuration.

Figure 7:
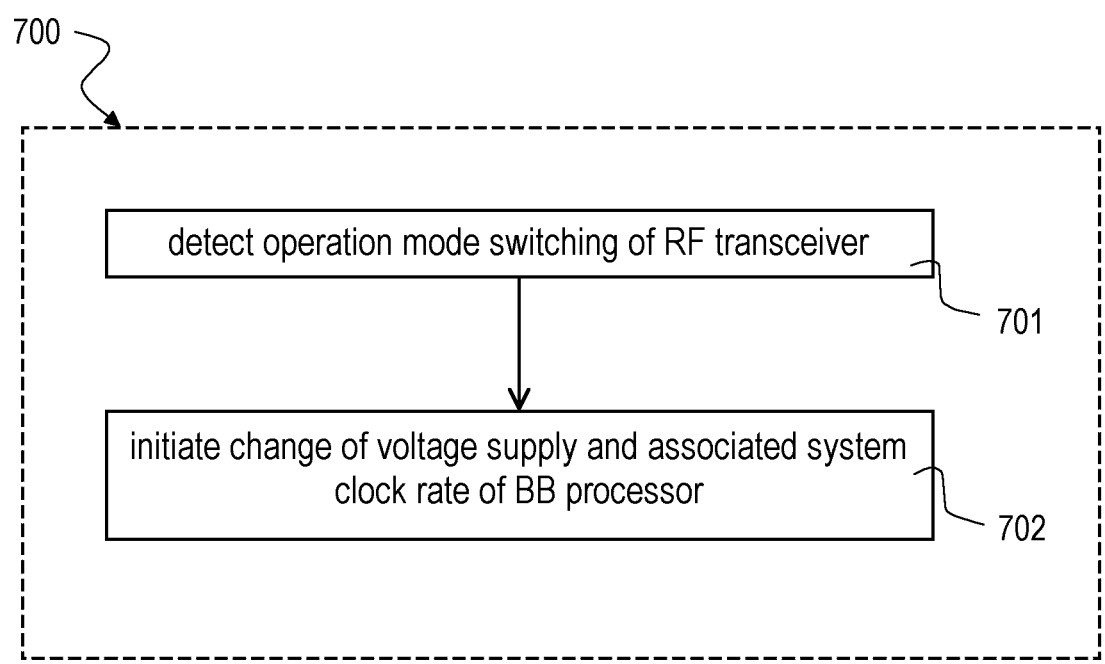
FIG. 7 is a schematic diagram illustrating an exemplary method 700 for voltage and clock settings configuration of a baseband processor.

FIG. 7 is a schematic diagram illustrating an exemplary method 700 for voltage and clock settings configuration of a baseband processor which is configured to process down-converted and quantized radio frequency, RF, signals of an RF transceiver in baseband, e.g. a baseband processor 112, 500 as described above with respect to FIGS. 1 to 6.

The method 700 comprises detecting 701 an RF operation mode switching of the RF transceiver; and initiating 702 a change of a voltage setting and an associated system clock rate of the baseband processor based on detecting the operation mode switching of the RF transceiver, e.g. as described above with respect to FIGS. 1 to 6.

Detecting 701 the RF operation mode switching may comprise detecting a Downlink Control Information, DCI, from a Physical Downlink Control Channel, PDCCH. The RF operation mode switching may comprise switching a bandwidth part, BWP, configuration of the RF transceiver. Switching the BWP configuration may comprise switching at least one of a numerology, a number of contiguous resource blocks, RBs, and frequency domain location information of the contiguous RBs.

The method 700 may further comprise: monitoring, by the baseband processor, decoded control information from a base station; and detecting a bandwidth part, BWP, switching request from the base station. The BWP switching request may comprise a new BWP configuration for the RF transceiver.

The method 700 may further comprise: controlling the RF transceiver to stop IQ sample traffic with the baseband processor in at least one of Uplink and Downlink upon detection of the BWP switching request.

The method 700 may further comprise: controlling the RF transceiver to change its BWP configuration to the new BWP configuration.

The method 700 may further comprise: determining a new minimum required system clock rate and an associated minimum required voltage setting value of the baseband processor based on a new BWP configuration for the RF transceiver.

The methods, devices and systems described in this disclosure may be implemented in Digital Signal Processors (DSP), micro-controllers or any other side-processor or hardware circuit on a chip or an application specific integrated circuit (ASIC). Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods described above with respect to FIGS. 5 to 8 and 11 and the computing blocks described above with respect to FIGS. 2, 9 and 10. Such a computer program product may include a non-transient readable storage medium storing program code thereon for use by a processor, the program code comprising instructions for performing the methods or the computing blocks as described above.

EXAMPLES

The following examples pertain to further embodiments. Example 1 is a baseband processor for processing down-converted and quantized radio frequency, RF, signals of an RF transceiver in baseband, wherein the baseband processor is configured to: detect an RF operation mode switching of the RF transceiver; and initiate a change of a voltage setting and an associated system clock rate of the baseband processor based on detecting the operation mode switching of the RF transceiver.

In Example 2, the subject matter of Example 1 can optionally include that detecting the RF operation mode switching comprises detecting a Downlink Control Information, DCI, from a Physical Downlink Control Channel, PDCCH.

In Example 3, the subject matter of Example 1 or Example 2 can optionally include that the RF operation mode switching comprises switching a bandwidth part, BWP, configuration of the RF transceiver.

In Example 4, the subject matter of Example 3 can optionally include that switching the BWP configuration comprises switching at least one of a numerology, a number of contiguous resource blocks, RBs, and frequency domain location information of the contiguous RBs.

In Example 5, the subject matter of Example 1 or Example 2 can optionally include that the baseband processor is configured to determine a new minimum required system clock rate and an associated minimum required voltage setting value of the baseband processor based on a new BWP configuration for the RF transceiver.

In Example 6, the subject matter of Example 5 can optionally include that the baseband processor is configured to determine the minimum required system clock rate and an associated minimum required voltage setting value of the baseband processor based on a sub-carrier spacing, SCS, and a number of resource blocks, RBs, within the new BWP configuration.

In Example 7, the subject matter of Example 5 can optionally include that the baseband processor is configured to: request a power management circuitry to update its voltage setting for the baseband processor according to the newly determined voltage setting value; and request a clock control circuitry to update a clock rate of the baseband processor according to the newly determined minimum required system clock rate.

In Example 8, the subject matter of Example 7 can optionally include that the baseband processor is configured to control the RF transceiver to reopen IQ sample traffic with the baseband processor after completion of the RF operation mode switching of the RF transceiver.

In Example 9, the subject matter of Example 8 can optionally include that the baseband processor is configured to control the RF transceiver to reopen IQ sample traffic with the baseband processor when the RF transceiver has changed its RF operation mode for the new BWP configuration and no earlier than a time at which the clock rate and the voltage setting value for the baseband processor has been changed.

In Example 10, the subject matter of Example 5 can optionally include that the baseband processor is configured to determine the new system clock rate based on a number of resource blocks associated to the new BWP configuration, a processing load within a time slot for the new BWP configuration and a time duration of the time slot.

In Example 11, the subject matter of Example 5 can optionally include that the baseband processor is configured to determine the new system clock rate as a minimum required system clock rate $f_{clk,min}$ according to the relation $f_{clk,min}=N_{rb}N_a/T_{slot}$, where $N_{rb}$ is a total number of resource blocks, RBs, within a new radio, NR, slot indicated by the new BWP configuration, $N_a$ is the number of processing operations normalized by the total number of RBs within a NR slot and $T_{slot}$ is the time duration of the NR slot.

In Example 12, the subject matter of Example 11 can optionally include that the baseband processor is configured to determine the time duration of the NR slot based on a sub-carrier-spacing, SCS, indicated by the new BWP configuration.

In Example 13, the subject matter of Example 12 can optionally include that the baseband processor is configured to: adapt a frequency domain filtering algorithm based on the SCS indicated by the new BWP, and adapt $N_a$ in the relation $f_{clk,min}=N_{rb}N_a/T_{slot}$ based on the adapted frequency domain filtering algorithm.

In Example 14, the subject matter of Example 3 can optionally include that the baseband processor is configured to adapt interference mitigation algorithms processed by the baseband processor based on a switching of the BWP configuration.

In Example 15, the subject matter of Example 14 can optionally include that the baseband processor is configured to disable the interference mitigation algorithms when the BWP is switched to have a different central carrier frequency so that the new BWP suffers less interference from adjacent bands.

In Example 16, the subject matter of Example 15 can optionally include that the baseband processor is configured to determine a new minimum required system clock rate and an associated minimum required voltage setting value of the baseband processor based on the adapted or disabled interference mitigation algorithms.

In Example 17, the subject matter of Example 3 can optionally include that the baseband processor is configured to signal a BWP switching window capability to the base station, wherein the switching window capability indicates a total time required for the RF transceiver to change its BWP configuration and for the baseband processor to change its voltage setting and associated system clock rate.

In Example 18, the subject matter of Example 1 or Example 2 can optionally include that the baseband processor is configured to change a voltage setting and an associated system clock rate independently per clock-voltage domain within the baseband processor.

Example 19 is a base station, configured to: transmit control information to a User Equipment, UE, wherein the control information indicates an RF operation mode switching of a radio frequency, RF, transceiver of the UE and a corresponding change of a voltage setting and an associated system clock rate of a baseband processor of the UE.

In Example 20, the subject matter of Example 19 can optionally include that the base station is configured to receive a Bandwidth Part, BWP, switching time window capability from the UE, wherein the BWP switching time window capability indicates a time window for the RF transceiver to change its Bandwidth Part, BWP, configuration and a time window for the baseband processor to change its voltage setting and associated system clock rate.

In Example 21, the subject matter of Example 20 can optionally include that the base station is configured to suspend scheduling of Physical Downlink Control Channel, PDCCH, and Physical Downlink Shared Channel, PDSCH, to the UE based on the switching window capability within the time window for the RF transceiver to change its BWP configuration.

Example 22 is a User Equipment, UE, circuitry, comprising: a radio frequency, RF, transceiver; a baseband processor configured to process down-converted and quantized RF signals of the RF transceiver in baseband, wherein the baseband processor is configured to: detect an RF operation mode switching of the RF transceiver; and initiate a change of a voltage setting and an associated system clock rate of the baseband processor based on detecting the operation mode switching of the RF transceiver.

In Example 23, the subject matter of Example 22 can optionally include that the baseband processor is configured to detect the RF operation mode switching based on a Downlink Control Information, DCI, from a Physical Downlink Control Channel, PDCCH.

In Example 24, the subject matter of Example 22 or Example 23 can optionally include that the baseband processor is configured to switch a bandwidth part, BWP, configuration of the RF transceiver based on detecting the RF operation mode switching of the RF transceiver.

In Example 25, the subject matter of Example 24 can optionally include that switching the BWP configuration comprises switching at least one of a numerology, a number of contiguous resource blocks, RBs, and frequency domain location information of the contiguous RBs.

In Example 26, the subject matter of Example 22 or Example 23 can optionally include: a power management circuitry, configured to provide the baseband processor with a voltage setting, wherein the baseband processor is configured to request the power management circuitry to update its voltage setting based on detecting the RF operation mode switching.

In Example 27, the subject matter of Example 22 or Example 23 can optionally include: a clock control circuitry, configured to provide the baseband processor with a clock rate, wherein the baseband processor is configured to request the clock control circuitry to update its clock rate based on detecting the RF operation mode switching.

Example 28 is a method for voltage and clock settings configuration of a baseband processor, wherein the baseband processor is configured to process down-converted and quantized radio frequency, RF, signals of an RF transceiver in baseband, the method comprising: detecting an RF operation mode switching of the RF transceiver; and initiating a change of a voltage setting and an associated system clock rate of the baseband processor based on detecting the operation mode switching of the RF transceiver.

In Example 29, the subject matter of Example 28 can optionally include that detecting the RF operation mode switching comprises detecting a Downlink Control Information, DCI, from a Physical Downlink Control Channel, PDCCH.

In Example 30, the subject matter of Example 28 or Example 29 can optionally include that the RF operation mode switching comprises switching a bandwidth part, BWP, configuration of the RF transceiver.

In Example 31, the subject matter of Example 28 or Example 29 can optionally include that switching the BWP configuration comprises switching at least one of a numerology, a number of contiguous resource blocks, RBs, and frequency domain location information of the contiguous RBs.

In Example 32, the subject matter of Example 28 or Example 29 can optionally include: determining a new minimum required system clock rate and an associated minimum required voltage setting value of the baseband processor based on a new BWP configuration for the RF transceiver.

Example 33 is a device for voltage and clock settings configuration of a baseband processor, wherein the baseband processor is configured to process down-converted and quantized radio frequency, RF, signals of an RF transceiver in baseband, the device comprising: means for detecting an RF operation mode switching of the RF transceiver; and means for initiating a change of a voltage setting and an associated system clock rate of the baseband processor based on detecting the operation mode switching of the RF transceiver.

In Example 34, the subject matter of Example 33 can optionally include means for detecting a Downlink Control Information, DCI, from a Physical Downlink Control Channel, PDCCH.

Example 35 is a system-on-chip, comprising: a radio frequency, RF, transceiver; a baseband processor configured to process down-converted and quantized RF signals of the RF transceiver in baseband, wherein the baseband processor is configured to: detect an RF operation mode switching of the RF transceiver; and initiate a change of a voltage setting and an associated system clock rate of the baseband processor based on detecting the operation mode switching of the RF transceiver.

In Example 36, the subject matter of Example 35 can optionally include a power management circuitry, configured to provide the baseband processor with a voltage setting, wherein the baseband processor is configured to request the power management circuitry to update its voltage setting based on detecting the RF operation mode switching.

In Example 37, the subject matter of Example 35 or Example 36 can optionally include a clock control circuitry, configured to provide the baseband processor with a clock rate, wherein the baseband processor is configured to request the power control circuitry to update its clock rate based on detecting the RF operation mode switching.

Example 38 is a computer readable non-transitory medium on which computer instructions are stored which when executed by a computer cause the computer to perform the method of any one of Examples 28 to 32.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. An apparatus, comprising:
   a memory; and
   a baseband processor in communication with the memory, wherein the baseband processor is configured to:
   detect a radio frequency (RF) operation mode switching of an RF transceiver of a user equipment device (UE) based on control information received from a base station, wherein the RF operation mode switching comprises bandwidth part (BWP) configuration switching for the RF transceiver, wherein a BWP comprises a contiguous set of physical resource blocks (RBs) selected from a contiguous subset of common RBs for a given numerology on a given carrier;
   initiate a change of a voltage setting and an associated system clock rate of the baseband processor based on the RF operation mode switching of the RF transceiver comprising the BWP configuration switching;
   adapt interference mitigation algorithms processed by the baseband processor based on the BWP configuration switching; and
   disable the interference mitigation algorithms when the BWP is switched to a new BWP having a different central carrier frequency so that the new BWP suffers reduced interference from adjacent bands.

2. The apparatus of claim 1,
   wherein the control information is received in a Downlink Control Information (DCI) from a Physical Downlink Control Channel (PDCCH).

3. The apparatus of claim 1,
   wherein, to switch the BWP configuration, the baseband processor is configured to switch at least one of a numerology, a number of contiguous RBs, and frequency domain location information of the contiguous RBs.

4. The apparatus of claim 1,
   wherein the baseband processor is further configured to:
   determine a new minimum required system clock rate and an associated minimum required voltage setting value of the baseband processor based on a new BWP configuration for the RF transceiver.

5. The apparatus of claim 4,
   wherein the baseband processor is further configured to:
   determine the minimum required system clock rate and an associated minimum required voltage setting value of the baseband processor based on a sub-carrier spacing (SCS) and a number of RBs within the new BWP configuration.

6. The apparatus of claim 4,
   wherein the baseband processor is further configured to:
   request a power management circuitry to update its voltage setting for the baseband processor according to the newly determined minimum required voltage setting value; and
   request a clock control circuitry to update a clock rate of the baseband processor according to the newly determined minimum required system clock rate.

7. The apparatus of claim 6,
   wherein the baseband processor is further configured to:
   control the RF transceiver to reopen in-phase and quadrature (IQ) sample traffic with the baseband processor after completion of the RF operation mode switching of the RF transceiver.

8. The apparatus of claim 7,
   wherein the baseband processor is further configured to:
   control the RF transceiver to reopen IQ sample traffic with the baseband processor when the RF transceiver has changed its RF operation mode for the new BWP configuration and no earlier than a time at which the clock rate and the voltage setting value for the baseband processor has been changed.

9. The apparatus of claim 4,
   wherein the baseband processor is further configured to:
   determine the new system clock rate based on a number of RBs associated with the new BWP configuration, a processing load within a time slot for the new BWP configuration, and a time duration of the time slot.

10. The apparatus of claim 4,
    wherein the baseband processor is further configured to:
    determine the new system clock rate as a minimum required system clock rate $f_{clk,min}$ according to the relation $f_{clk,min}=N_{rb}N_a/T_{slot}$, where $N_{rb}$ is a total number of RBs within a new radio, NR, slot indicated by the new BWP configuration, Na is the number of processing operations normalized by the total number of RBs within a NR slot and $T_{slot}$ is the time duration of the NR slot.

11. The apparatus of claim 10,
    wherein the baseband processor is further configured to:
    determine the time duration of the NR slot based on a sub-carrier-spacing (SCS) indicated by the new BWP configuration.

12. The apparatus of claim 11,
    wherein the baseband processor is further configured to:
    adapt a frequency domain filtering algorithm based on the SCS indicated by the new BWP, and
    adapt Na in the relation $f_{clk,min}=N_{rb}N_a/T_{slot}$ based on the adapted frequency domain filtering algorithm.

13. A User Equipment (UE), comprising:
    a radio frequency (RF) transceiver; and
    a baseband processor configured to process down-converted and quantized RF signals of the RF transceiver in baseband, wherein the baseband processor is configured to:
    detect an RF operation mode switching of the RF transceiver based on control information received from a base station, wherein the RF operation mode switching comprises bandwidth part (BWP) configuration switching for the RF transceiver, wherein a BWP comprises a contiguous set of physical resource blocks selected from a contiguous subset of common resource blocks for a given numerology on a given carrier;
    initiate a change of a voltage setting and an associated system clock rate of the baseband processor based on the RF operation mode switching of the RF transceiver comprising the BWP configuration switching;
adapt interference mitigation algorithms processed by the baseband processor based on the BWP configuration switching; and
disable the interference mitigation algorithms when the BWP is switched to a new BWP having a different central carrier frequency so that the new BWP suffers reduced interference from adjacent bands.

14. The UE of claim 13, wherein the control information is received in a Downlink Control Information (DCI) from a Physical Downlink Control Channel (PDCCH).

15. The UE of claim 13, wherein, to switch the BWP configuration, the baseband processor is configured to switch at least one of a numerology, a number of contiguous resource blocks (RBs), and frequency domain location information of the contiguous RBs.

16. The UE of claim 13, wherein the baseband processor is further configured to:
determine a new minimum required system clock rate and an associated minimum required voltage setting value of the baseband processor based on a new BWP configuration for the RF transceiver.

17. A method for voltage and clock settings configuration of a baseband processor of a User Equipment (UE), wherein the baseband processor is configured to process down-converted and quantized radio frequency, RF, signals of an RF transceiver of the UE, the method comprising:
detecting an RF operation mode switching of the RF transceiver based on control information received from a base station, wherein the RF operation mode switching comprises bandwidth part (BWP) configuration switching for the RF transceiver, wherein a BWP comprises a contiguous set of physical resource blocks selected from a contiguous subset of common resource blocks for a given numerology on a given carrier;
initiating a change of a voltage setting and an associated system clock rate of the baseband processor based on the RF operation mode switching of the RF transceiver comprising the BWP configuration switching;
adapting interference mitigation algorithms processed by the baseband processor based on the BWP configuration switching; and
disabling the interference mitigation algorithms when the BWP is switched to a new BWP having a different central carrier frequency so that the new BWP suffers reduced interference from adjacent bands.

18. The method of claim 17, wherein the control information is received in a Downlink Control Information (DCI) from a Physical Downlink Control Channel (PDCCH).

19. The method of claim 17, wherein switching the BWP configuration comprises switching at least one of a numerology, a number of contiguous resource blocks (RBs), and frequency domain location information of the contiguous RBs.

20. The method of claim 17, further comprising:
determining a new minimum required system clock rate and an associated minimum required voltage setting value of the baseband processor based on a new BWP configuration for the RF transceiver.

* * * * *